Figures 1, 2:
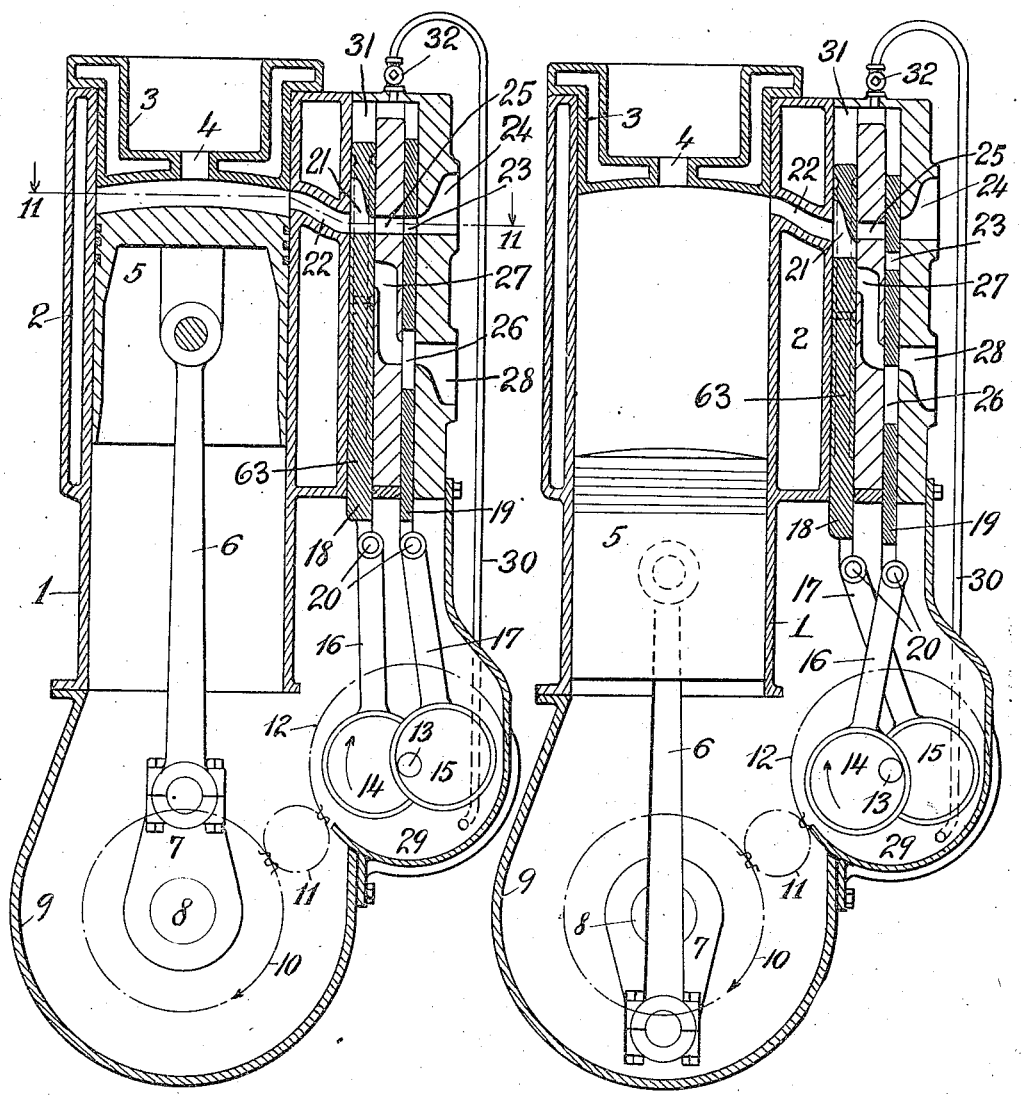

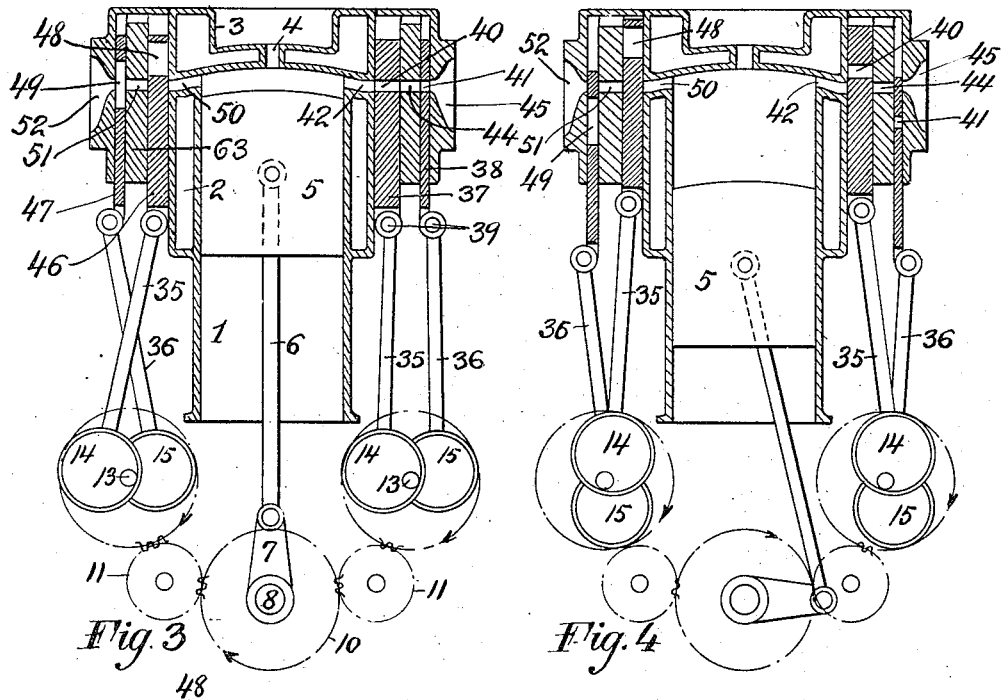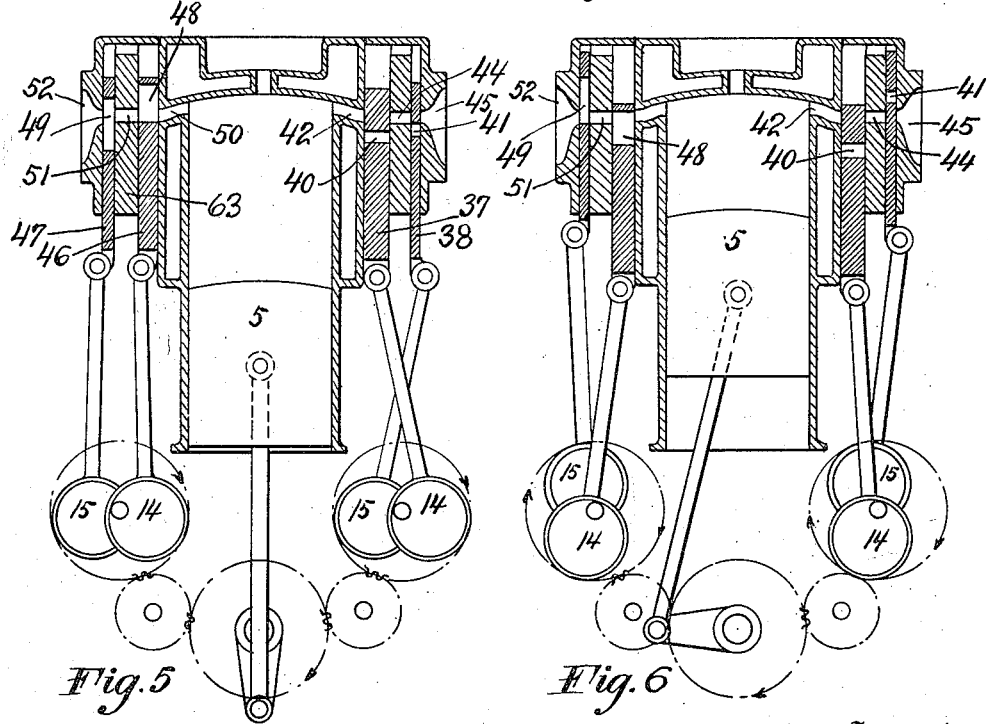

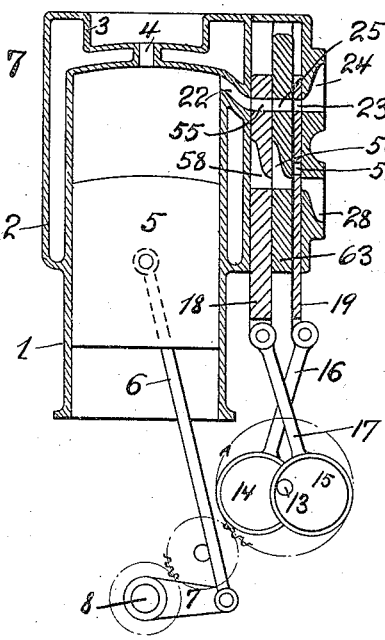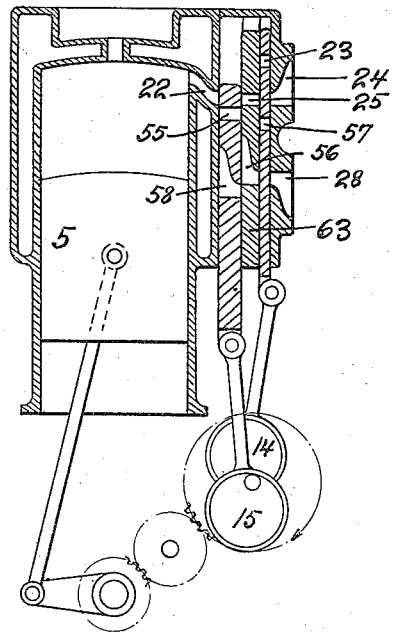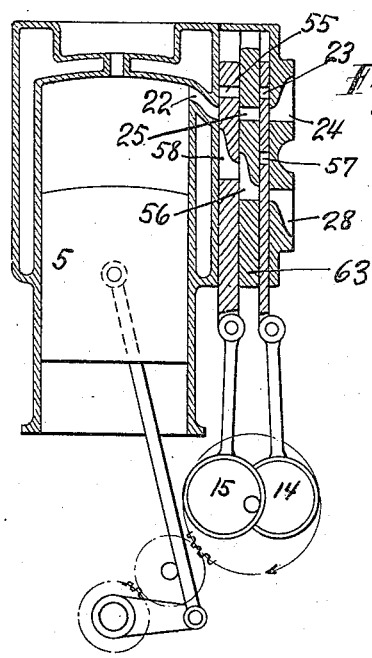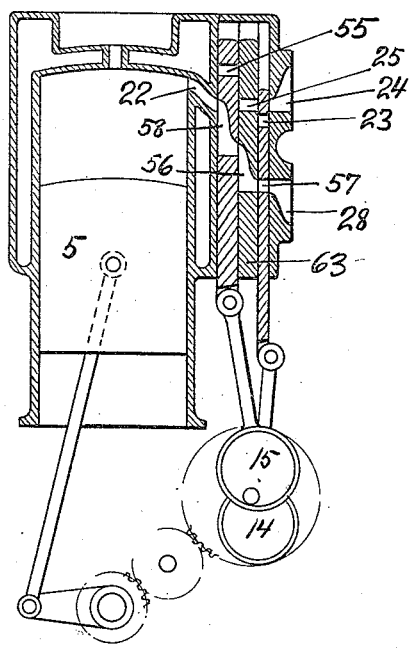

O. A. EN HOLM.
GAS ENGINE VALVE GEAR.
APPLICATION FILED JULY 26, 1912.
1,149,565.
Patented Aug. 10, 1915.
4 SHEETS—SHEET 4.
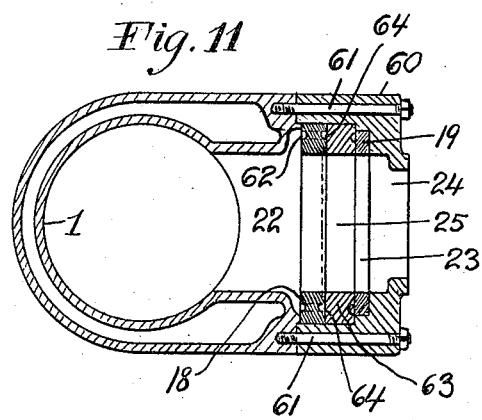
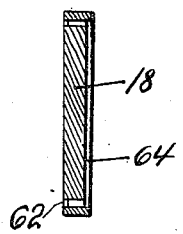
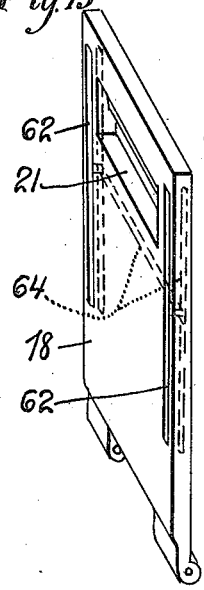
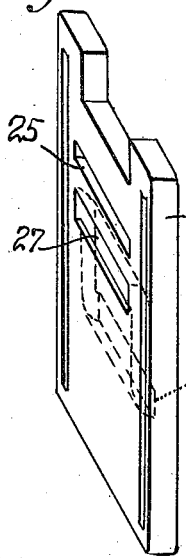
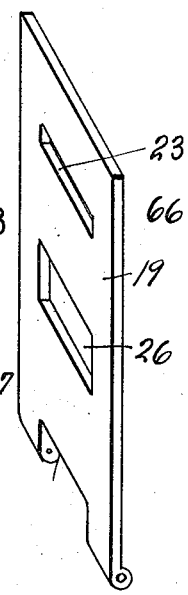
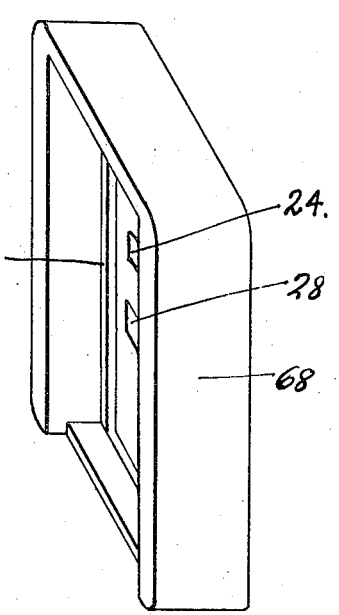
Witnesses:
Joseph Connolly Jr
H. C. Egan
Inventor
Oscar A. En Holm,
By his Attorneys
Edwards, Sager & Wooster.

cl
UNITED STATES PATENT OFFICE.

OSCAR A. EN HOLM, OF NEW YORK, N. Y.

GAS-ENGINE VALVE-GEAR.

1,149,565.  Specification of Letters Patent.  Patented Aug. 10, 1915.

Application filed July 26, 1912. Serial No. 711,613.

*To all whom it may concern:*

Be it known that I, OSCAR A. EN HOLM, a citizen of the United States, residing at 449 West One Hundred and Sixty-third street, in the city and county of New York and State of New York, have invented certain new and useful Improvements in Gas-Engine Valve-Gear, of which the following is a full, clear, and exact specification.

This invention relates to gas engine valve gear and reference to an improved slide-valve gear mechanism for either four or two-cycle gas engines, whereby an engine of either type can be more readily controlled than with puppet valves, and also to provide a construction of valve gear which can be removed as a unit from the engine cylinder without disorganizing the entire machine.

According to the preferred form of the invention shown, I combine with a plurality of slide-valves an intermediate balancing plate, the slides being also provided with lubricating passages associated with the balancing passages and the gas ports, so that the two slides and the balancing plate can be mounted in a single detachable casing, thereby permitting the valves to be interchangeable, or readily removed in case of accident.

A further feature of the invention resides in the means for regulating and adjusting the timing of the valves so that the various intervals of the cycle can be varied by simple adjustments, in order to adapt the engine for various kinds of duty.

In the accompanying drawings Figures 1 and 2 are sectional elevations of a two cycle engine embodying the invention. Figs. 3 to 6 inclusive, show a modified form of the invention wherein the supply and exhaust valves are on opposite sides of the engine. Figs. 7 to 10, inclusive, are sectional elevations of the invention applied to a four cycle engine, showing various valve positions. Fig. 11 is a cross section showing the arrangement of slide valves; Fig. 12 is a cross section of one slide showing the balancing grooves; Fig. 13 is a detail of one valve in perspective; Fig. 14 is a detail of the stationary plate; Fig. 15 is a detail of the other valve; and Fig. 16 is a detail of the valve slide chamber.

1 represents a cylinder having a water-jacket 2, cylinder head 3, with the threaded hole 4 to receive a spark plug.

5 represents the working piston having a connecting rod 6 operating cranks 7 on the main shaft 8, preferably contained in a crank case 9. The crank shaft 8 carries a gear 10 which meshes with idler 11, driving a valve operating gear 12 of the same diameter as 10 and mounted on auxiliary shaft 13. Carried by the auxiliary shaft 13 are two eccentrics 14, 15, set preferably at about 160° apart. The eccentrics are connected by straps 16, 17 with slide valves 18, 19, the straps being pivoted as shown at 20. The slide 18 is provided with an elongated port 21, which opens and closes the cylinder port 22, and the slide 19 is provided with an inlet port 23 controlling stationary inlet ports 24, 25 in conjunction with the cylinder port 22 and the moving port 21. The slide 19 is also provided with an exhaust port 26 which in conjunction with moving port 21 and stationary ports 27, 28 opens and closes cylinder port 22 for the exhaust of gas.

29 represents an oil chamber from which leads a pipe 30 upwardly into the small chamber 31 above the two slides 18, 19, 32 being a check valve, which prevents backward flow of oil, the slides when in operation acting as pumps to positively feed oil from the oil reservoir for lubricating the slides.

Fig. 1 of the drawings shows the position of parts at the commencement of the down stroke, the inlet through port 22 being about to be closed by the upward movement of slide 18, while at the same time the slide 19 is cutting off the inlet at stationary port 25 in moving downward. During the downward, or working stroke of main piston 5, the slide 18 at first moves upward to its highest position, while slide 19 moves downward to its lowest position. These respective extremes of the slides not being simultaneous. Preferably, the slide 18 commences to move down, slightly before the slide 19 commences to move up, depending upon the angle between the eccentrics 14, 15. In practice, the slide 18 will commence to move down when the main crank 7 is somewhat before the quarter stroke, and the slide 19 moves up when the crank 7 is slightly after the quarter stroke. The exhaust port will be opened just at or after crank 7 passes the half stroke, by the downward movement of slide 18 so that port 21 connects ports 22 and 27, simultaneously with the upward movement of port 26 of slide 19 from below ports 27, 28. The exhaust port is fully open before the main crank 7 reaches ⅝ stroke and remains fully open on account of the length of ports 21 and 26 until crank 7 is at approximately ⅞ stroke, or slightly before. At the maximum lowest position of slide 18 the lower edge of port 21 is about even with the lower edge of stationary port 27. The exhaust port is fully closed just beyond ⅞ stroke of crank 7 by the upward movement of port 21 away from port 27, there being sufficient lap between stationary ports 27 and 25 to allow port 21 to be fully closed. The inlet opens as soon as port 21 crosses stationary ports 22 and 25 and moving port 23 moves downwardly across stationary ports 25 and 24.

In the form shown in Figs. 1 and 2, it will be observed that the exhaust takes place through most of the upward stroke of the working piston leaving a very small residue of burned gas in the cylinder, which is negligible, it being seen that the charge will be admitted to the cylinder under practically firing pressure and fired as soon as the inlet is closed by the upward movement of port 21 of slide 18, which is at about $\frac{1}{16}$ stroke of crank 7. In carrying out this form of the invention, I propose to employ a compressor preferably driven by the engine for supplying the charge.

In Figs. 3 to 6 inclusive, the invention is somewhat modified, in its application to a two cycle engine, these forms being shown diagrammatically, but being in detail construction similar to the form of Figs. 1 and 2 and the valve details of Figs. 11 to 16, which latter will be fully described hereinafter. In Figs. 3 to 6, the inlet valve gear is shown on the right and the exhaust on the left there being on each side an auxiliary shaft 13, with eccentrics 14, 15, similar to those before described, it being understood that the angle between the eccentrics may be varied according to the particular duty of the engine or the character of fuel used, or the exact opening and closing of ports desired. Referring first to the inlet valve gear, the eccentrics 14, 15, are connected by rods 35, 36 with slides 37, 38, pivoted as at 39, each of these slides 37, 38, having one port as 40, 41, which coöperates with a fixed cylinder port 42, and a fixed intermediate port 44, and an external inlet port 45. The slides are lubricated by the same mechanism as before described, it not being illustrated in these figures. On the exhaust side are provided two slides 46, 47 operated by the exhaust eccentrics 14, 15 respectively, the slides being provided with elongated ports 48, 49, which coöperate with a fixed cylinder port 50, a fixed intermediate port 51 and an external exhaust port 52. In this form, Fig. 3 shows the inlet of charge through ports 45, 41, 43, 40, 42, from a source of supply not shown. The inlet of gas commences before upper dead center, and continues until the upward movement of slide 37 and the downward movement of slide 38 cut off the inlet, shortly after dead center, whereupon the charge is fired. It will be seen that in Fig. 4, the inlet has been cut off considerably before quarter stroke, Fig. 4 showing an intermediate portion of the working stroke. Fig. 5 shows the position at half stroke with the exhaust open through ports 50, 48, 51, 49, 52, which continues to adjacent the position at ¾ stroke shown in Fig. 6, wherein the slide 46 is about to move up and slide 47 nearly ready to move down, it being seen that the exhaust is cut off by the upward movement of slide 46 across cylinder port 50 slightly before the upward dead-center position of Fig. 3.

In Figs. 7 to 10, inclusive, is shown an example of my valve gear combined with a four cycle engine the parts being numbered similarly to Figs. 1 and 2, it being understood that the eccentric shaft 13 rotates at one-half the speed of the gear shaft 8 instead of at the same speed as in Fig. 1. In this form, it will be observed that the ports 24, 25 and 28 are similar to the correspondingly numbered ports in Figs. 1 and 2 while port 55 differs in length from port 21, and port 56 is similar to 26, the slides 18 being provided in Figs. 7 to 10 with an additional port 58 not shown in Fig. 1. Port 57 is similar to port 26 in Fig. 1, but shorter. By the addition of one more port 58 to the slides 18 and 19, with somewhat different spacing and half speed drive, it will be seen that my valve gear is readily adapted from two cycle to four cycle operation, the timing, of course, being properly changed as is well understood. Fig. 7 shows the intermediate or suction inlet position. Fig. 8 shows an intermediate compression position. Fig. 9 an intermediate working position, and Fig. 10, an intermediate exhaust position, it being unnecessary to further describe the various valve positions, other than to say that by proper displacement of the eccentrics and spacing of ports, accurate four cycle positions are readily obtained.

In carrying out my invention as shown in the foregoing two cycle and four cycle forms, the slides are mounted and constructed as shown in Fig. 11, this being a horizontal section taken on the line 11—11 in Fig.

1. The cylinder casting is machined at one side, adjacent the cylinder port 22, to receive a valve-box 60 which is detachably fastened to the cylinder by bolts 61. Finished to slide on the engine side of the cylinder casting is the slide 18, (see Fig. 13), which is provided with interconnected balancing and lubricating grooves 62, 64, on its opposite faces, shown in dotted lines in the sectioned portion of slide 18 in Fig. 11. The area of these grooves is made substantially equal to the cylinder port area. The intermediate ports 25, 27, are carried in a separating plate 63, having lubricating grooves in opposite sides which communicate by holes drilled through. The plate 63 is fitted so that the slide 18 will have a substantially gas-tight fit between the side of the casting and the plate 63. The slide 19 having the ports 23, 26, is similarly fitted between the opposite side of the balancing plate 63 and the shoulders 66 of the box 60. If desired, the slide 19 can be provided with grooves similar to the slide 18, but this is unnecessary ordinarily, since the slide 18 cuts off the slide 19 from engine pressure during most of the cycle.

A particular advantage of my improvement resides in the detachability of the valve gear, rendering it much more accessible for inspection, repair or renewal of parts, than valve gears now in common use, inasmuch as it is only necessary to remove the casing, disconnect the pivots 20 and remove the bolts 61, in order to remove the valve gear as a complete unit, which will in practice be made interchangeable so that repairs or substitutions can be quickly made. Moreover, the pumping action of the slides will be such that it can be readily adjusted so that only sufficient oil will be fed to thoroughly lubricate the slides without excess, it being apparent that any excess will either be blown out during the exhaust or carried into the cylinder with the inlet, so that the valve gear will be at all times readily lubricated and at the same time balanced against excessive friction due to gas pressure. Moreover, it will be seen that the oil will assist in preventing leakage of gas, over and above the machining of the parts, and that the pressure on one slide is not transmitted to the other slide, the intermediate separating plate acting to receive and neutralize both thrusts.

A further advantage of the invention resides in the disposition of the valve gear outside the engine cylinder proper, so that the various parts are not subject to excessively high temperatures of the gases, and can also be easily cooled by water-jackets without increasing the complexity of the engine. By having the valves at some distances from the cylinder, without ojectionably increasing the compression and dead space, they do not become heated to such an extent as to either deteriorate objectionably, or stick.

Various changes in the location and arrangement of parts and in proportions may be made without departing from the scope of the appended claims.

Having thus described my invention, what I claim as new, and desire to secure by Letters Patent is:—

1. A valve gear for a combustion engine comprising in combination with a cylinder having a port, a plurality of slides, one having a plurality of ports, an interposed separating plate having port openings coöperating with the ports of said slides, and means for reciprocating said slides and means comprising additional passages in said slides for balancing against lateral pressure.

2. The combination with a cylinder having a port, of a double ported casing carried by said cylinder and inclosing said cylinder port, a fixed plate carried by said casing and having ports alined with the ports of said casing but separated therefrom and from said cylinder port, a ported slide at each side of said stationary plate, and means for reciprocating said slides to alternately connect said cylinder port with said ported casing through the ports of said stationary plate.

3. In a combustion engine valve gear, the combination with a casing containing a pair of ported slides, one subject to engine pressure and the other to external pressure, of an interposed plate carried by said casing and having a gas port and balancing grooves, and balancing grooves in said slides coöperating with said grooves in said plate.

4. A valve gear for a combustion engine, comprising a casing open on one side and having a port in the opposite side, a ported plate carried by said casing between said opposite sides, a slide between said open side of said casing and said plate, a second slide between said plate and the port of said casing, means for attaching said casing to an engine, and means for reciprocating said slides to control said ports.

5. A valve gear for a combustion engine, comprising a casing open on one side and having a port in the opposite side, a ported plate carried by said casing between said opposite sides, a slide between said open side of said casing and said plate, a second slide between said plate and the port of said casing, means for attaching said casing to an engine, an oil chamber above said slides, and means whereby the movement of said slides positively feeds oil to said chamber and thence to said slides, and means for reciprocating said slides to control said ports.

6. In a combustion engine, the combination of a cylinder having a port, a sliding valve having a port and provided with connected balancing grooves on both sides, the area of which are equal to the areas of the cylinder port, and a fixed plate adapted to receive the engine pressure through said balancing grooves.

7. A valve gear for a combusion engine comprising in combination with a cylinder having a port, a plurality of slides, each having a port, an interposed stationary plate having port openings coöperating with the ports of said slides, means for balancing the pressure on said slides and means for actuating said slides.

In testimony whereof I affix my signature in presence of two witnesses.

OSCAR A. EN HOLM.

Witnesses:
K. G. LE ARD,
H. C. EGAN.